US012639079B2

(12) United States Patent
    Gu et al.

(10) Patent No.:     US 12,639,079 B2
(45) Date of Patent:        May 26, 2026

(54) OPERATING SYSTEM STARTUP METHOD, APPARATUS, AND ELECTRONIC DEVICE

(71) Applicant: Beijing Bytedance Network Technology Co., Ltd., Beijing (CN)

(72) Inventors: Zhenghao Gu, Beijing (CN); Shijian Ge, Beijing (CN); Yongji Xie, Beijing (CN); Lei Yu, Beijing (CN); Shuai Yuan, Beijing (CN); Xiaohan Xu, Beijing (CN); Xiaobo Yan, Beijing (CN); Yongsu Zhang, Beijing (CN); Yu Zhang, Beijing (CN); Jian Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 148 days.

(21) Appl. No.: 18/689,803

(22) PCT Filed: Oct. 9, 2022

(86) PCT No.: PCT/CN2022/124072
    § 371 (c)(1),
    (2) Date: Mar. 6, 2024

(87) PCT Pub. No.: WO2023/061287
    PCT Pub. Date: Apr. 20, 2023

(65) Prior Publication Data
    US 2024/0370274 A1     Nov. 7, 2024

(30) Foreign Application Priority Data
    Oct. 15, 2021     (CN) .......................... 202111204021.1

(51) Int. Cl.
    G06F 9/4401          (2018.01)
(52) U.S. Cl.
    CPC ................................. G06F 9/4406 (2013.01)

(58) Field of Classification Search
    None
    See application file for complete search history.

(56) References Cited

U.S. PATENT DOCUMENTS 7,788,477 B1     8/2010  Huang et al.
9,665,380 B2 *   5/2017  Hiltgen ................. G06F 9/4416
                            (Continued)

FOREIGN PATENT DOCUMENTS

CN        101166116 A     4/2008
CN        102457541 A     5/2012
                (Continued)

OTHER PUBLICATIONS

ISA China National Intellectual Property Administration, Written Opinion Issued in Application No. PCT/CN2022/124072, Dec. 29, 2022, WIPO, 9 pages.
                (Continued)

*Primary Examiner* — Fahmida Rahman
(74) *Attorney, Agent, or Firm* — Alleman Hall LLP

(57)              ABSTRACT

Embodiments of the present disclosure provide an operating system startup method, apparatus and electronic device. A specific implementation of the method comprises: determining at least one target mirror server from a mirror server cluster based on a LinuxBoot on a diskless server, wherein a mirror file stored in a mirror server comprises a system kernel and a file system; downloading mirror file fragments from a target mirror server of the at least one target mirror server based on the LinuxBoot; assembling a plurality of downloaded mirror file fragments into a target mirror file; and booting an operating system of the diskless server based on a target system kernel and a target file system comprised in the target mirror file. Therefore, the efficiency and success rate of diskless boot-up of an operating system of the
                (Continued)

Determine at least one target mirror server from a mirror server cluster based on a LinuxBoot on a diskless server — 101

Download mirror file fragments from a target mirror server of the at least one target mirror server based on the LinuxBoot — 102

Assemble a plurality of downloaded mirror file fragments into a target mirror file — 103

Boot an operating system of the diskless server based on a target system kernel and a target file system comprised in the target mirror file — 104 diskless server can be improved when booting the operating system based on the LinuxBoot.

18 Claims, 4 Drawing Sheets

(56)       References Cited

U.S. PATENT DOCUMENTS

| | | |
|---|---|---|
| 2003/0088650 A1 | 5/2003 | Fassold et al. |
| 2010/0115066 A1* | 5/2010 | Burnett ................. G06F 9/4416 |
| | | 711/170 |
| 2011/0296159 A1 | 12/2011 | Hong et al. |
| 2016/0124737 A1* | 5/2016 | Dubois ..................... G06F 8/63 |
| | | 713/1 |

FOREIGN PATENT DOCUMENTS

| | | |
|---|---|---|
| CN | 103744695 A | 4/2014 |
| CN | 107426258 A | 12/2017 |
| CN | 108958742 A | 12/2018 |
| CN | 109376122 A | 2/2019 |
| CN | 109992311 A | 7/2019 |
| CN | 110912955 A | 3/2020 |
| CN | 112068892 A | 12/2020 |
| CN | 112367415 A | 2/2021 |
| CN | 113900720 A | 1/2022 |
| WO | 2021169397 A1 | 9/2021 |

OTHER PUBLICATIONS

ISA China National Intellectual Property Administration, International Search Report Issued in Application No. PCT/CN2022/124072, Dec. 29, 2022, WIPO, 4 pages.

China National Intellectual Property Administration, Search Report Issued in Application No. 202111204021.1, Jul. 3, 2023, 4 pages. Submitted with partial English translation.

Xinbo, R., "Laboratory system based on PXE remote start technology diskless plate with the data of practical study," Available Online at www.cnki.net, 5 pages.

* cited by examiner

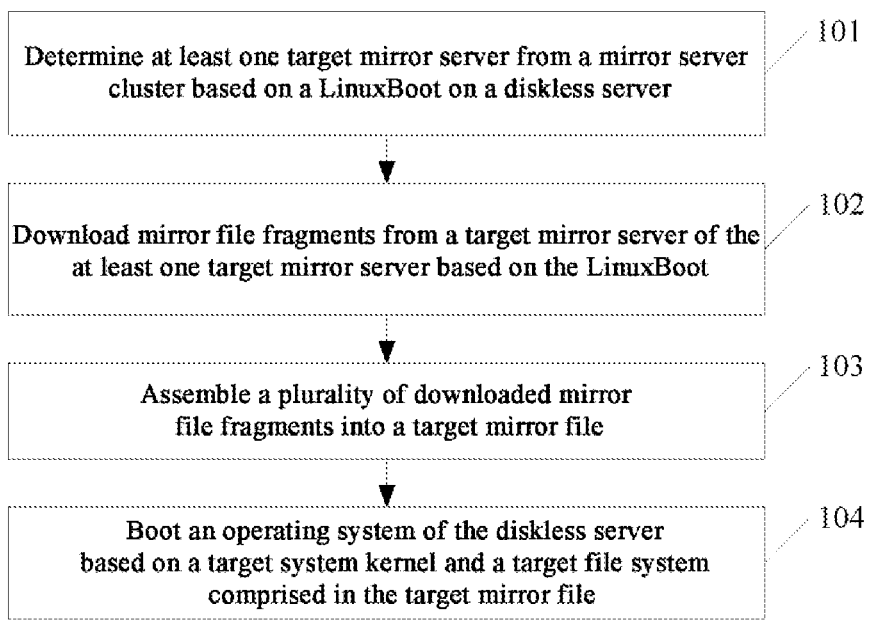

Determine at least one target mirror server from a mirror server cluster based on a LinuxBoot on a diskless server — 101

Download mirror file fragments from a target mirror server of the at least one target mirror server based on the LinuxBoot — 102

Assemble a plurality of downloaded mirror file fragments into a target mirror file — 103

Boot an operating system of the diskless server based on a target system kernel and a target file system comprised in the target mirror file — 104

FIG. 1

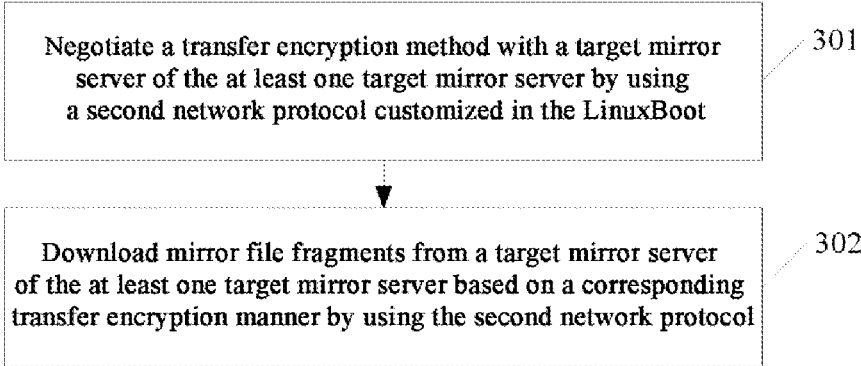

Negotiate a transfer encryption method with a target mirror
server of the at least one target mirror server by using
a second network protocol customized in the LinuxBoot — 301

Download mirror file fragments from a target mirror server
of the at least one target mirror server based on a corresponding
transfer encryption manner by using the second network protocol — 302

FIG. 3

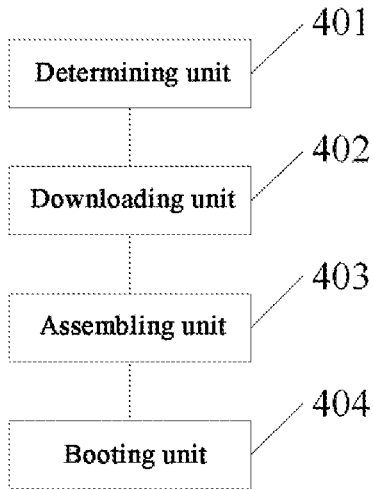

Determining unit — 401

Downloading unit — 402

Assembling unit — 403

Booting unit — 404

FIG. 4

OPERATING SYSTEM STARTUP METHOD, APPARATUS, AND ELECTRONIC DEVICE

CROSS-REFERENCE TO RELATED APPLICATION(S)

This application is a national stage application filed under 35 U.S.C. 371 based on International Patent Application No. PCT/CN2022/124072, filed Oct. 9, 2022, which claims priority to Chinese Application No. 202111204021.1 filed with the Chinese Patent office on Oct. 15, 2021 and entitled "OPERATING SYSTEM STARTUP METHOD, APPARATUS, AND ELECTRONIC DEVICE", the disclosures of which are incorporated herein by reference in their entireties.

FIELD

Embodiments of the present disclosure relate to the technical field of computers, and in particular, to an operating system startup method, apparatus, and electronic device.

BACKGROUND

With the development of computer technology, servers can boot operating systems without hard disks installed therein.

In the related art, the server downloads a file for booting an operating system and realizes diskless boot-up of the operating system based on the file. At this point, the efficiency and success rate of file downloads are closely related to the diskless boot-up of the operating system.

SUMMARY

This Summary is provided to introduce concepts in a simplified form that are further described below in the Detailed Description. This Summary is not intended to identify key features or essential features of the technical solution as defined, nor is it intended to be used to limit the scope thereof.

Embodiments of the present disclosure provide an operating system startup method, apparatus and electronic device, which can improve the efficiency and success rate of diskless boot-up of an operating system when booting the operating system of a diskless server based on the Linux-Boot.

In a first aspect, an embodiment of the present disclosure provides an operating system startup method, the method comprising: determining at least one target mirror server from a mirror server cluster based on a LinuxBoot on a diskless server, wherein a mirror file stored in a mirror server comprises a system kernel and a file system; downloading mirror file fragments from a target mirror server of the at least one target mirror server based on the LinuxBoot; assembling a plurality of downloaded mirror file fragments into a target mirror file; and booting an operating system of the diskless server based on a target system kernel and a target file system comprised in the target mirror file.

In a second aspect, an embodiment of the present disclosure provides an operating system booting apparatus, the apparatus comprising: a determining unit, configured for determining at least one target mirror server from a mirror server cluster based on a LinuxBoot on a diskless server, wherein a mirror file stored in a mirror server contains a system kernel and a file system; a downloading unit, configured for downloading mirror file fragments from a target mirror server of the at least one target mirror server based on the LinuxBoot; an assembling unit, configured for assembling a plurality of downloaded mirror file fragments into a target mirror file; and a booting unit, configured for booting an operating system of the diskless server based on a target system kernel and a target file system contained in the target mirror file.

In a third aspect, an embodiment of the present disclosure further provides an electronic device, comprising: at least one processor; a storage unit for storing at least one program, the at least one program, when executed by the at least one processor, causing the at least one processor to perform an operating system startup method according to the first aspect.

In a fourth aspect, an embodiment of the present disclosure further provides a computer readable medium, on which a computer program is stored, the program, when executed by a processor, causing the processor perform the steps of an operating system startup method according to the first aspect.

BRIEF DESCRIPTION OF THE DRAWINGS

Through the more detailed description of detailed implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn scale.

FIG. 1 shows a flowchart of some embodiments of an operating system startup method of the present disclosure;

FIG. 3 shows a flowchart of downloading mirror file fragments in some embodiments of the operating system startup method of the present disclosure;

FIG. 4 shows a structural schematic diagram of some embodiments of an operating system booting apparatus of the present disclosure;

DETAILED DESCRIPTION OF EMBODIMENTS

Figure 2:
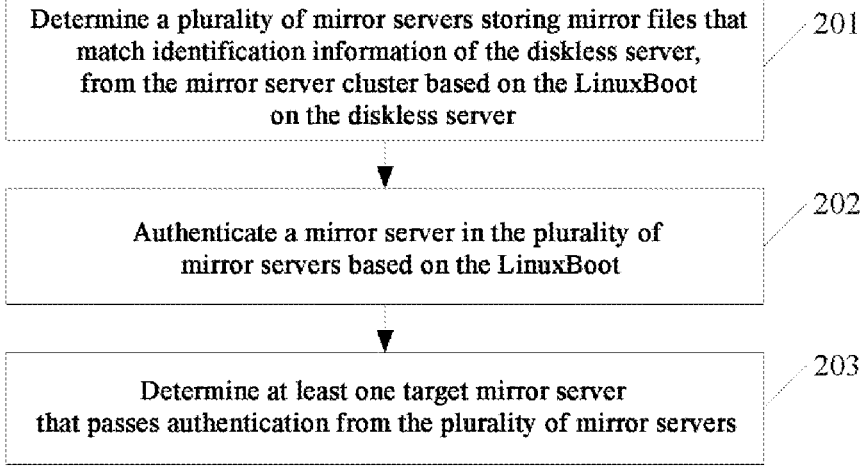
FIG. 2 shows a flowchart of determining at least one target mirror server in some embodiments of the operating system startup method of the present disclosure.

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in a different order and/or in parallel. In addition, the method implementations may comprise an additional step and/or omit a step which is shown. The scope of the present disclosure is not limited in this regard.

The term "comprise" and its variants used here are to be read as open terms that mean "include, but is not limited to." The term "based on" is to be read as "based at least in part on." The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

Names of messages or information interacted between a plurality of apparatuses in the implementations of the present disclosure are merely for the illustration purpose, rather than limiting the scope of these messages or information.

With reference to FIG. 1, this figure shows the flow of some embodiments of an operating system startup method according to the present disclosure. As depicted, the operating system startup method comprises the following steps:

S101: determining at least one target mirror server from a mirror server cluster based on LinuxBoot on a diskless server.

The diskless server may be a server without a hard disk configured therein. The diskless server is provided with LinuxBoot, which is firmware with user-editable code.

A mirror file can be stored on a mirror server in a mirror server cluster, wherein the mirror file may contain a file system and a system kernel for booting the operating system (i.e., the kernel of the operating system).

The execution body of the operating system startup method may determine at least one target mirror server from a mirror server cluster based on a LinuxBoot on a diskless server.

Step 102: downloading mirror file fragments from a target mirror server of the at least one target mirror server based on the LinuxBoot.

A mirror file may consist of a plurality of mirror file fragments.

The execution body may download mirror file fragments from a target mirror server of the at least one target mirror server based on the LinuxBoot. In some scenarios, the execution body may download different mirror file fragments from different target mirror servers. In other scenarios, the execution body may download different mirror file fragments from the same target mirror server.

Step 103: assembling the plurality of downloaded mirror file fragments into a target mirror file.

In case that the download of a plurality of mirror file fragments for forming a mirror file is completed, the execution body may assemble the plurality of downloaded mirror file fragments into a target mirror file.

Step 104: booting the operating system of the diskless server based on a target system kernel and target file system contained in the target mirror file.

The execution body may boot the operating system of the diskless server based on a target system kernel and target file system contained in the target mirror file. The operating system of the diskless server may be a Linux operating system.

In this embodiment, a mirror file for booting the operating system is stored on a mirror server in a mirror server cluster. A plurality of mirror file fragments are downloaded from a target mirror server of the at least one target mirror server, and the plurality of downloaded mirror file fragments are assembled into a target mirror file for booting the operating system. On the one hand, by respectively downloading the plurality of mirror file fragments for forming the mirror file, the download efficiency of the target mirror file may be increased. On the other hand, by downloading the mirror file fragments from the at least one target mirror server in the mirror server cluster, the target mirror file still can be successfully downloaded even when some mirror servers fail. Thereby, when booting an operating system of a diskless server based on LinuxBoot, the efficiency and success rate of diskless boot-up of the operating system may be improved.

In some embodiments, mirror servers in the mirror server cluster are located on a current network segment where the diskless server is located and/or other network segments.

The current network segment may be a network segment where the diskless server is located. The other network segments may be network segments other than the current network segment.

It may be understood that the number of mirror servers may be increased by deploying the mirror servers on different network segments. Thus, the efficiency and success rate of downloading mirror file fragments from the mirror servers may be further improved.

In some embodiments, the execution body may determine the at least one target mirror server from the mirror server cluster according to a flow shown in FIG. 2. The flow comprises the following steps.

Step 201: determining a plurality of mirror servers storing mirror files that match identification information of the diskless server from the mirror server cluster based on the LinuxBoot on the diskless server.

Optionally, the identification information of the diskless server comprises model information of the diskless server. At this point, the execution body may determine a plurality of mirror servers storing mirror files that match the model of the diskless server from the mirror server cluster.

Step 202: authenticating mirror servers of the plurality of mirror servers based on the LinuxBoot.

In some scenarios, the execution body may authenticate a mirror server in the following way. Specifically, authentication information of the mirror server may be obtained from the mirror server by using a second network protocol customized in LinuxBoot, wherein the authentication information is target information (e.g., the number of the mirror server) encrypted with the public key of the diskless server. Further, the obtained authentication information may be decrypted with the private key of the diskless server, and it is determined whether the target information resulting from the decryption is correct or not. If the obtained target information is correct, then it may be determined that the mirror server passes authentication. If not, it may be determined that the mirror server does not pass authentication.

Step 203: determining at least one target mirror server that passes authentication from the plurality of mirror servers.

It may be understood that by authenticating mirror servers storing mirror files that match the diskless server, the security of mirror file fragments downloaded from the target mirror server that passes authentication may be guaranteed, and in turn, the security of the assembled target mirror file may be guaranteed. Thereby, the security of the operating system may be guaranteed when booting the operating system of the diskless server based on LinuxBoot.

In some embodiments, the execution body may determine a plurality of mirror servers storing mirror files that matching the identification information of the diskless server in a way as below.

In a first step, a query request containing identification information of the diskless server is broadcast using a first network protocol customized in the LinuxBoot, so as to cause a mirror server in the mirror server cluster which receives the query request to query whether a stored mirror file matches the identification information, and return query result information to the diskless server.

The first network protocol may be a protocol customized by editing code of the LinuxBoot.

The query result information comprises at least one of: characterizing whether a stored mirror file matches the identification information; version information of a stored mirror file that matches the identification information.

In a second step, a plurality of mirror servers storing mirror files that match the identification information and belong to pre-configured versions are determined from mirror servers that return the query result information.

As can be seen, using the first network protocol, it is possible to filter out a plurality of mirror servers storing mirror files that not only match the diskless server and but also belong to pre-configured versions. Further, a target mirror file in a pre-configured version may be assembled from mirror file fragments downloaded from the resulting mirror servers. Thereby, the target mirror file in the required version may be flexibly downloaded according to actual needs.

In some embodiments, mirror servers in the mirror server cluster are located on a current network segment where the diskless server is located and/or other network segments; the first network protocol supports the broadcast of the query request on the current network segment and/or the other network segments.

In some scenarios, the first network protocol may comprise DHCP (dynamic host configuration protocol), wherein DHCP supports the broadcast of the query request on the current network segment and/or the other network segments.

As can be seen, with the characteristic of the customizable first network protocol in LinuxBoot and by broadcasting the query request, it is possible to determine, from mirror servers located on different network segments, a plurality of mirror servers storing image files that match the diskless server and that belong to pre-configured versions.

In some embodiments, the execution body may download mirror file fragments from a target mirror server of the at least one target mirror server according to a flow shown in FIG. 3. The flow comprises the following steps.

Step 301: negotiating a transfer encryption manner with a target mirror server of the at least one target mirror server by using a second network protocol customized in the Linux-Boot.

The transfer encryption manner may be an encryption manner of the target mirror server for transferring mirror file fragments to the diskless server.

It is noteworthy that the transfer encryption manners negotiated with different target mirror servers may be same or different.

Step 302: downloading mirror file fragments from a target mirror server of the at least one target mirror server based on a corresponding transfer encryption manner by using the second network protocol.

As can be seen, by using the second network protocol, it is possible to realize the encrypted transfer of mirror file fragments from the target mirror server to the diskless server. Thereby, the risk of mirror file fragments being tampered with during transmission can be reduced, and in turn, the security of the target mirror file assembled can be guaranteed. Further, the secure boot-up of the operating system of the diskless server can be ensured.

In some embodiments, mirror servers in the mirror server cluster are located on a current network segment where the diskless server is located and/or other network segments; the second network protocol supports the download of mirror file fragments from the current network segment and/or the other network segments.

In some scenarios, the second network protocol may include, but not limited to, at least one of: TFTP (trivial file transfer protocol), SCP (secure copy) protocol, FTP (file transfer protocol), and HTTP (hyper text transfer protocol), wherein TFTP supports the download of mirror file fragments from the current network segment, and SCP, FTP as well as HTTP support the download of mirror file fragments from the current network segment and the other network segments.

As can be seen, with the characteristic of the customizable second network protocol in LinuxBoot, it is possible to download mirror file fragments from target mirror servers on different network segments.

In some embodiments, the execution body may download mirror file fragments from a target mirror server of the at least one target mirror server in a way as below.

Specifically, regarding each mirror file fragment for forming a mirror file, the execution body may perform a downloading step, which may comprise steps S1~S2.

Step S1: separately downloading the mirror file fragments from at least two target mirror servers based on the Linux-Boot.

Step S2: in case that at least two separately downloaded mirror file fragments are the same, retaining one of the at least two separately downloaded mirror file fragments.

In some embodiments, the downloading step may further comprise step S3.

Step S3: in case that at least two separately downloaded mirror file fragments are different, re-performing the down-loading step.

By re-performing the downloading step, it is possible to finally realize that the same mirror file fragment is downloaded from at least two target mirror servers.

It may be understood that in case that mirror file fragments downloaded from at least two target mirror servers are the same, then the download mirror file fragment has a higher reliability. In case that the mirror file fragments downloaded from at least two target mirror servers are different, the downloaded mirror file fragments have a lower reliability.

Thus, by comparing whether mirror file fragments downloaded from at least two target mirror servers are the same or not, a plurality of highly reliable mirror file fragments can be downloaded, and in turn, the reliability of the assembled target mirror file can be guaranteed. Further, the security of the operating system of the diskless server can be guaranteed when booting the operation system based on the LinuxBoot.

Further with reference to FIG. 4, as the implementation of the method shown in the various figures, the present disclosure provides some embodiments of an operating system booting apparatus. The apparatus embodiment corresponds to the method embodiment shown in FIG. 1, and specifically, the apparatus may be applied to various electronic devices.

As shown in FIG. 4, the operating system booting apparatus in this embodiment comprises a determining unit 401, a downloading unit 402, an assembling unit 403 and a booting unit 404. The determining unit 401 is configured for determining at least one target mirror server from a mirror server cluster based on LinuxBoot on a diskless server, wherein a mirror file stored in a mirror server contains a system kernel and a file system; the downloading unit 402 is configured for downloading mirror file fragments from a target mirror server of the at least one target mirror server based on the LinuxBoot; the assembling unit 403 is config- ured for assembling a plurality of downloaded mirror file fragments into a target mirror file; and the booting unit 404 is configured for booting an operating system of the diskless server based on a target system kernel and a target file system contained in the target mirror file.

In this embodiment, the specific processing and technical effects of the determining unit 401, the downloading unit 402, the assembling unit 403 and the booting unit 404 of the operating system booting apparatus may be referred to the relevant illustration of steps 101, 102, 103 and 104 in the corresponding embodiment of FIG. 1, which is not detailed here.

In some embodiments, the determining unit 401 is further configured for: determining a plurality of mirror servers storing mirror files that match identification information of the diskless server, from the mirror server cluster based on the LinuxBoot on the diskless server; authenticating a mirror server in the plurality of mirror servers based on the Linux-Boot; and determining at least one target mirror server that passes authentication from the plurality of mirror servers.

In some embodiments, the determining unit 401 is further configured for: using a first network protocol customized in the LinuxBoot, broadcasting a query request that contains identification information of the diskless server so as to cause a mirror server in the mirror server cluster which receives the query request to query whether stored mirror files match the identification information and to return query result information to the diskless server, wherein the query result information comprises at least one of: characterizing whether stored mirror files match the identification infor- mation; version information of stored mirror files that match the identification information; determining a plurality of mirror servers storing mirror files that match the identifica-tion information and belong to pre-configured versions from mirror servers that return the query result information.

In some embodiments, mirror servers in the mirror server cluster are located on a current network segment where the diskless server is located and/or other network segments; the first network protocol supports the broadcast of the query request on the current network segment and/or the other network segments.

In some embodiments, the downloading unit 402 is fur-ther configured for: negotiating a transfer encryption manner with a target mirror server of the at least one target mirror server by using a second network protocol customized in the LinuxBoot; and downloading mirror file fragments from a target mirror server of the at least one target mirror server based on a corresponding transfer encryption manner by using the second network protocol.

In some embodiments, mirror servers in the mirror server cluster are located on a current network segment where the diskless server is located and/or other network segments; the second network protocol supports the download of mirror file fragments from the current network segment and/or the other network segments.

In some embodiments, mirror servers in the mirror server cluster are located on a current network segment where the diskless server is located and/or other network segments.

In some embodiments, the downloading unit 402 is fur-ther configured for: regarding each mirror file fragment, performing a downloading step of: downloading the mirror file fragment respectively from at least two target mirror servers based on the LinuxBoot; in case that the at least two separately downloaded mirror file fragments are the same, retaining one of the at least two separately downloaded mirror file fragments.

In some embodiments, the downloading unit 402 is fur-ther configured for re-performing the downloading step in case that the at least two separately downloaded mirror file fragments are different.

Figure 5:
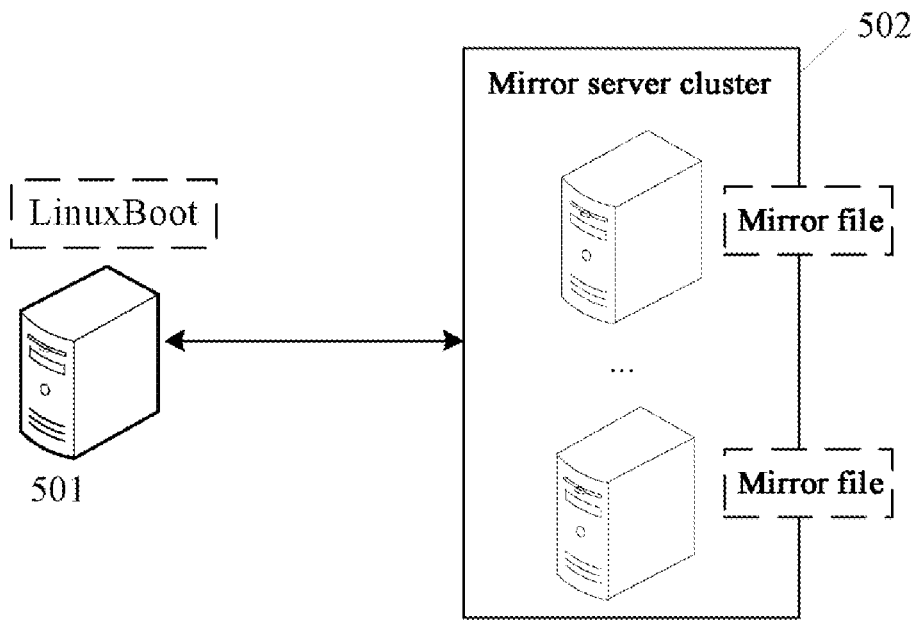
FIG. 5 shows an example system architecture in which some embodiments of the operating system startup method of the present disclosure may be applied.

Further with reference to FIG. 5, this figure shows an example system architecture in which an operating system startup method according to some embodiments of the present disclosure may be applied.

As shown in FIG. 5, the system architecture may com-prise a diskless server 501 and a mirror server cluster 502, wherein the diskless server 501 may interact mirror servers via a network.

The diskless server 501 is provided with LinuxBoot. Mirror servers in the mirror server cluster 502 store mirror files. In some scenarios, the diskless server 501 may deter-mine at least one target mirror server from the mirror server cluster 502 based on the LinuxBoot. The diskless server 501 may download mirror file fragments from a target mirror server of the at least one target mirror server based on the LinuxBoot. The diskless server 501 may assemble a plural-ity of downloaded mirror file fragments into a target mirror file. The diskless server 501 may boot an operating system based on a target system kernel and a target file system contained in the target mirror file.

The diskless server and mirror servers may be hardware or software. When the diskless server and mirror servers are hardware, they may be implemented as a distributed server cluster consisting of a plurality of servers or as a single server. When the diskless server and mirror servers are software, they may be implemented as a plurality of soft-ware or software modules (e.g., a plurality of software or software modules for providing distributed services) or as a single software or software module, which is not limited in this regard.

It is noteworthy that the operating system startup method provided by the embodiments of the present disclosure may be performed by the diskless server 501, and accordingly, the operating system booting apparatus may be arranged in the diskless server 501.

It may be understood that the respective number of the diskless server and mirror servers in FIG. 5 is merely illustrative. According to implementation needs, there may be any number of diskless servers and mirror servers.

Figure 6:
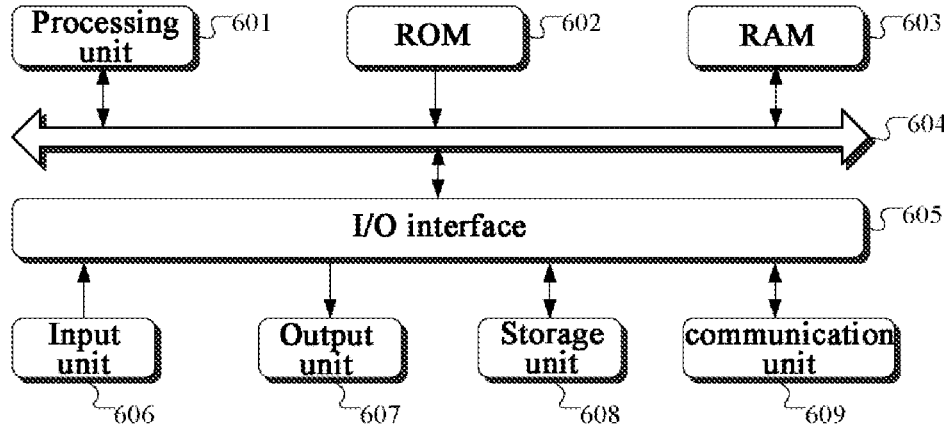
FIG. 6 shows a schematic diagram of a basic structure of an electronic device provided by some embodiments of the present disclosure.

Reference is made to FIG. 6 below, which shows a structural schematic diagram of an electronic device (e.g., the diskless server 501 in FIG. 5) suitable for implementing the embodiments of the present disclosure. The electronic device shown in FIG. 6 is merely an example and should not be construed to impose any limitations on the functionality and use scope of the embodiments of the present disclosure.

As shown in FIG. 6, the electronic device may comprise a processing unit (e.g., a central processor, a graphics processor) 601 which is capable of performing various appropriate actions and processes in accordance with programs stored in a read only memory (ROM) 602 or programs loaded from a storage unit 608 to a random access memory (RAM) 603. In the RAM 603, there are also stored various programs and data required by the electronic device 600 when operating. The processing unit 601, the ROM 602 and the RAM 603 are connected to one another via a bus 604. An input/output (I/O) interface 605 is also connected to the bus 604.

Usually, the following units may be connected to the I/O interface 605: input units 606 including a touch screen, a touch pad, a keyboard, a mouse, a camera, a microphone, an accelerometers, a gyroscope, or the like; an output unit 607, such as a liquid-crystal display (LCD), a loudspeaker, a vibrator, or the like; a storage units 608, such as a magnetic tape, a hard disk or the like; and a communication unit 609. The communication unit 609 allows the electronic device to perform wireless or wired communication with other device so as to exchange data with other device. While FIG. 6 shows the electronic device with various units, it should be understood that it is not required to implement or have all of the illustrated units. Alternatively, more or less units may be implemented or exist. Each block shown in FIG. 6 may represent one units or a plurality of units according to needs.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication unit 609, or installed from the storage unit 608, or installed from the ROM 602. The computer program, when executed by the processing unit 601, perform the above functions defined in the method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

In some implementations, the client and the server may communicate using any network protocol that is currently known or will be developed in future, such as the hyper text transfer protocol (HTTP) and the like, and may be interconnected with digital data communication (e.g., communication network) in any form or medium. Examples of communication networks include local area networks (LANs), wide area networks (WANs), inter-networks (e.g., the Internet) and end-to-end networks (e.g., ad hoc end-to-end networks), as well as any networks that are currently known or will be developed in future.

The above computer readable medium may be included in the above-mentioned electronic device; and it may also exist alone without being assembled into the electronic device. The computer readable medium carries one or more programs which, when executed by the electronic device, cause the electronic device to: determine at least one target mirror server from a mirror server cluster based on LinuxBoot on a diskless server; download mirror file fragments from a target mirror server of the at least one target mirror server based on the LinuxBoot; assemble a plurality of downloaded mirror file fragments into a target mirror file; and boot an operating system of the diskless server based on a target system kernel and a target file system contained in the target mirror file.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units described in the embodiments of the present disclosure may be implemented as software or hardware. Wherein the name of a unit does not form any limitation to the module per se. For example, the determining unit may further be described as a "unit configured for determining at least one target mirror server from a mirror server cluster based on LinuxBoot on a diskless server."

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, apparatus or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

What is claimed is:

1. An operating system startup method, comprising:
determining at least one target mirror server from a mirror server cluster based on a LinuxBoot on a diskless server, wherein a mirror file stored in a mirror server comprises a system kernel and a file system;
downloading mirror file fragments from a target mirror server of the at least one target mirror server based on the LinuxBoot;
assembling a plurality of downloaded mirror file fragments into a target mirror file; and
booting an operating system of the diskless server with a target system kernel and a target file system comprised in the target mirror file,
wherein downloading the mirror file fragments from the target mirror server of the at least one target mirror server based on the LinuxBoot comprises:
negotiating a transfer encryption manner with the target mirror server of the at least one target mirror server by using a second network protocol customized in the LinuxBoot; and
downloading the mirror file fragments from the target mirror server of the at least one target mirror server based on a corresponding transfer encryption manner by using the second network protocol.

2. The method according to claim 1, wherein determining the at least one target mirror server from the mirror server cluster based on the LinuxBoot on the diskless server comprises:
determining a plurality of mirror servers storing mirror files that match identification information of the diskless server, from the mirror server cluster based on the LinuxBoot on the diskless server;
authenticating a mirror server in the plurality of mirror servers based on the LinuxBoot; and
determining the at least one target mirror server that passes authentication from the plurality of mirror servers.

3. The method according to claim 2, wherein determining the plurality of mirror servers storing mirror files that match identification information of the diskless server, from the mirror server cluster based on the LinuxBoot on the diskless server comprises:
broadcasting a query request that comprises identification information of the diskless server using a first network protocol customized in the LinuxBoot, causing a mirror server in the mirror server cluster which receives the query request to query whether stored mirror files match the identification information and to return query result information to the diskless server, wherein the query result information comprises at least one of: characterizing whether stored mirror files match the identification information; version information of stored mirror files that match the identification information;
determining a plurality of mirror servers storing mirror files that match the identification information and belong to pre-configured versions from mirror servers that return the query result information.

4. The method according to claim 3, wherein mirror servers in the mirror server cluster are located on a current network segment where the diskless server is located and/or other network segments; the first network protocol supports the broadcast of the query request on the current network segment and/or the other network segments.

5. The method according to claim 1, wherein mirror servers in the mirror server cluster are located on a current network segment where the diskless server is located and/or other network segments.

6. The method according to claim 1, wherein mirror servers in the mirror server cluster are located on a current network segment where the diskless server is located and/or other network segments; the second network protocol supports the download of mirror file fragments from the current network segment and/or the other network segments.

7. The method according to claim 1, wherein downloading the mirror file fragments from the target mirror server of the at least one target mirror server based on the LinuxBoot comprises:

regarding each mirror file fragment, performing a downloading step of:

downloading the mirror file fragment respectively from at least two target mirror servers based on the Linux-Boot; in case that the at least two separately downloaded mirror file fragments are the same, retaining one of the at least two separately downloaded mirror file fragments.

8. The method according to claim 7, wherein the downloading step further comprises:

re-performing the downloading step in case that the at least two separately downloaded mirror file fragments are different.

9. A non-transitory computer readable medium, on which a computer program is stored, wherein the program, when executed by a processor, causes the program perform a method of:

determining at least one target mirror server from a mirror server cluster based on a LinuxBoot on a diskless server, wherein a mirror file stored in a mirror server comprises a system kernel and a file system;

downloading mirror file fragments from a target mirror server of the at least one target mirror server based on the LinuxBoot;

assembling a plurality of downloaded mirror file fragments into a target mirror file; and booting an operating system of the diskless server based on a target system kernel and a target file system comprised in the target mirror file, wherein downloading the mirror file fragments from the target mirror server of the at least one target mirror server based on the LinuxBoot comprises:

negotiating a transfer encryption method with the target mirror server of the at least one target mirror server by using a second network protocol customized in the LinuxBoot; and downloading the mirror file fragments from the target mirror server of the at least one target mirror server based on a corresponding transfer encryption manner by using the second network protocol.

10. The non-transitory computer readable medium according to claim 9, wherein determining the at least one target mirror server from the mirror server cluster based on the LinuxBoot on the diskless server comprises:

determining a plurality of mirror servers storing mirror files that match identification information of the diskless server, from the mirror server cluster based on the LinuxBoot on the diskless server;

authenticating a mirror server in the plurality of mirror servers based on the LinuxBoot; and determining at least one target mirror server that passes authentication from the plurality of mirror servers.

11. An electronic device, comprising:

at least one processor;

storage unit for storing at least one program, the at least one program, when executed by the at least one processor, causing the at least one processor perform a method of:

determining at least one target mirror server from a mirror server cluster based on a LinuxBoot on a diskless server, wherein a mirror file stored in a mirror server comprises a system kernel and a file system;

downloading mirror file fragments from a target mirror server of the at least one target mirror server based on the LinuxBoot;

assembling a plurality of downloaded mirror file fragments into a target mirror file; and booting an operating system of the diskless server based on a target system kernel and a target file system comprised in the target mirror file, wherein downloading the mirror file fragments from the target mirror server of the at least one target mirror server based on the LinuxBoot comprises:

negotiating a transfer encryption method with the target mirror server of the at least one target mirror server by using a second network protocol customized in the LinuxBoot; and downloading the mirror file fragments from the target mirror server of the at least one target mirror server based on a corresponding transfer encryption manner by using the second network protocol.

12. The electronic device according to claim 11, wherein mirror servers in the mirror server cluster are located on a current network segment where the diskless server is located and/or other network segments.

13. The electronic device according to claim 11, wherein determining the at least one target mirror server from the mirror server cluster based on the LinuxBoot on the diskless server comprises:

determining a plurality of mirror servers storing mirror files that match identification information of the diskless server, from the mirror server cluster based on the LinuxBoot on the diskless server;

authenticating a mirror server in the plurality of mirror servers based on the LinuxBoot; and determining at least one target mirror server that passes authentication from the plurality of mirror servers.

14. The electronic device according to claim 13, wherein determining the plurality of mirror servers storing the mirror files that match identification information of the diskless server, from the mirror server cluster based on the Linux-Boot on the diskless server comprises:

broadcasting a query request that comprises identification information of the diskless server using a first network protocol customized in the LinuxBoot, causing a mirror server in the mirror server cluster which receives the query request to query whether stored mirror files match the identification information and to return query result information to the diskless server, wherein the query result information comprises at least one of: characterizing whether stored mirror files match the identification information; version information of stored mirror files that match the identification information;

determining a plurality of mirror servers storing mirror files that match the identification information and belong to pre-configured versions from mirror servers that return the query result information.

15. The electronic device according to claim 14, wherein mirror servers in the mirror server cluster are located on a current network segment where the diskless server is located and/or other network segments; the first network protocol supports the broadcast of the query request on the current network segment and/or the other network segments.

16. The electronic device according to claim 11, wherein mirror servers in the mirror server cluster are located on a current network segment where the diskless server is located and/or other network segments; the second network protocol supports the download of mirror file fragments from the current network segment and/or the other network segments.

17. The electronic device according to claim 11, wherein downloading the mirror file fragments from the target mirror server of the at least one target mirror server based on the LinuxBoot comprises:

regarding each mirror file fragment, performing a downloading step of:

downloading the mirror file fragment respectively from at least two target mirror servers based on the LinuxBoot; in case that the at least two separately downloaded mirror file fragments are the same, retaining one of the at least two separately downloaded mirror file fragments.

18. The electronic device according to claim 17, wherein the downloading step further comprises:

re-performing the downloading step in case that the at least two separately downloaded mirror file fragments are different.

* * * * *